Sept. 24, 1968  A. M. SQUIRES  3,402,998
PROCESSES FOR DESULFURIZING FUELS
Filed June 9, 1966  2 Sheets-Sheet 1
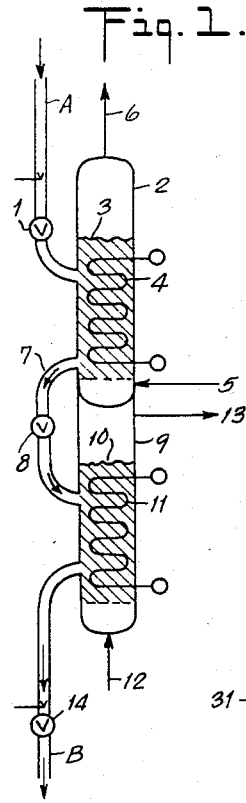
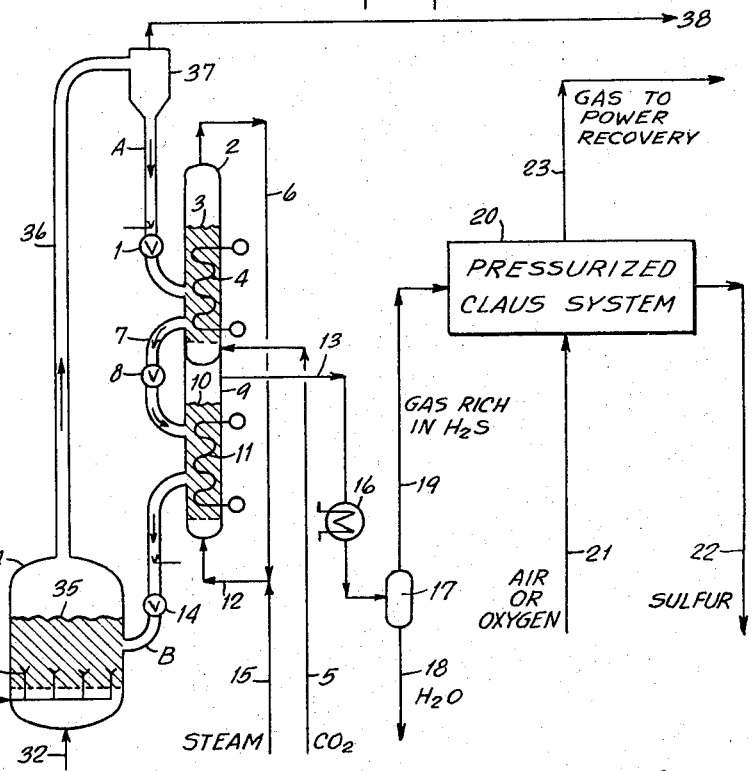
INVENTOR
ARTHUR M. SQUIRES
BY
ATTORNEY

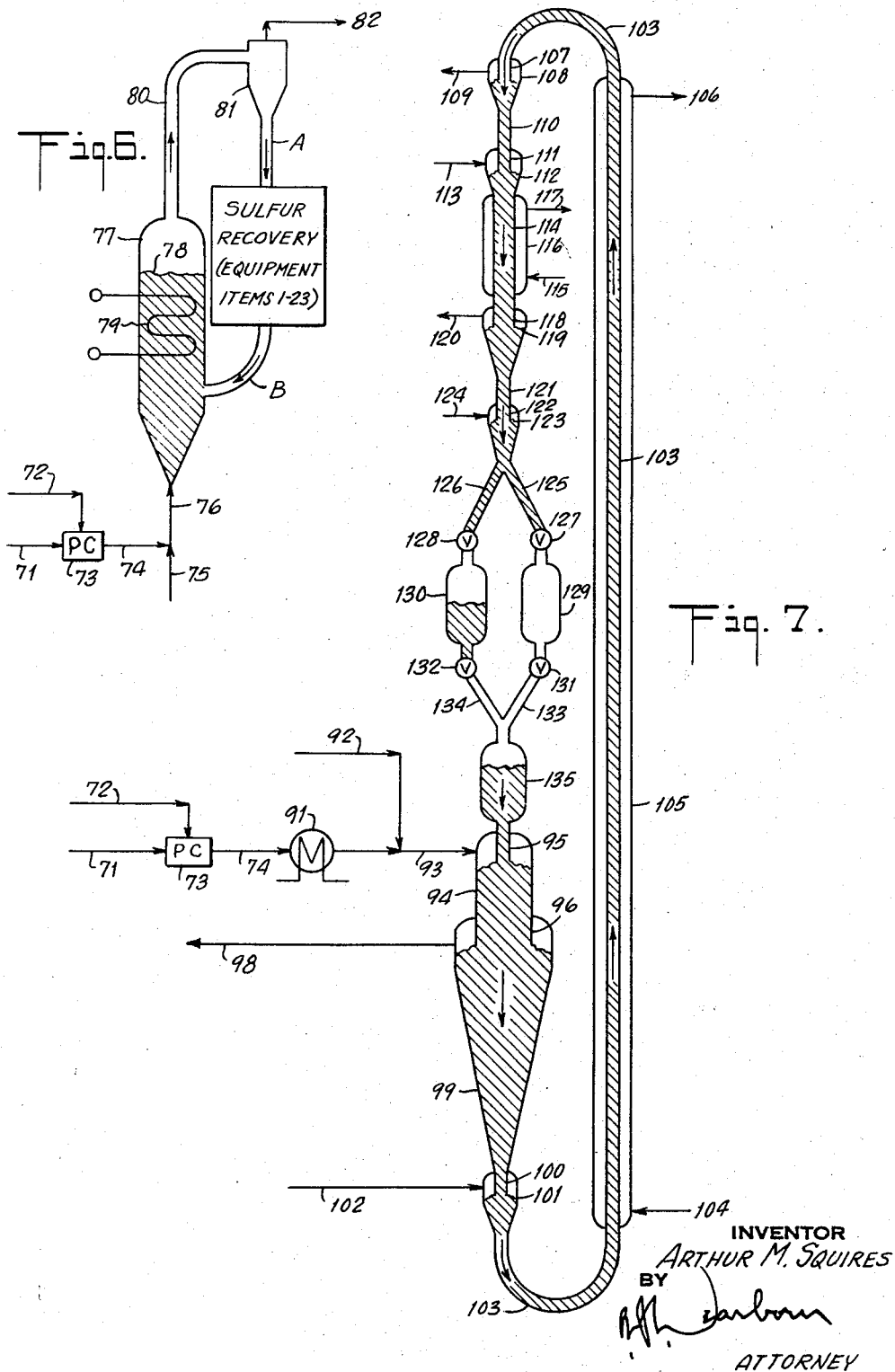

United States Patent Office 3,402,998
Patented Sept. 24, 1968

3,402,998
PROCESSES FOR DESULFURIZING FUELS
Arthur M. Squires, 245 W. 104th St.,
New York, N.Y. 10025
Continuation-in-part of application Ser. No. 337,900,
Jan. 15, 1964. This application June 9, 1966, Ser.
No. 556,434
19 Claims. (Cl. 23—181)

ABSTRACT OF THE DISCLOSURE

There is provided a process for recovering elemental sulfur from sulfurized calcined dolomite, such as is formed when either fully calcined dolomite or "half-burnt" dolomite is used to desulfurize a sulfur-bearing fuel. The sulfurized calcined dolomite is reacted with steam and carbon dioxide at elevated temperature and elevated pressure to yield hydrogen sulfide and half-burnt dolomite. Hydrogen sulfide may be converted to sulfur in a system of the Claus type, preferably operating at substantially the same elevated pressure. The solid resulting from the reaction with steam and carbon dioxide is suitable for re-use in a fuel-desulfurization step, either directly or after calcination. Examples are discussed in which the invention is used in conjunction with the desulfurization of a fuel undergoing gasification, cracking, hydrogasification, or hydrocracking; also, in conjunction with the desulfurization of a gas containing carbon monoxide undergoing shift over calcined dolomite.

Background of the invention

This application is a continuation-in-part of my application Ser. No. 337,900, filed Jan. 15, 1964, now U.S. Patent 3,276,203 (October 1966).

Summary of the invention

This invention relates to an improved method for preparing hydrogen sulfide from a solid containing calcium sulfide, the method being useful in the preparation of sulfur, the desulfurization of a fuel, or the preparation of hydrogen sulfide.

An object of the invention is to provide an improved economic method whereby elemental sulfur may be recovered in a process for desulfurizing a sulfur-bearing fuel.

Another object of the invention is to provide an improved economic method for converting a sulfur-bearing fuel into a substantially sulfur-free gaseous product, while recovering sulfur in form of elemental sulfur or hydrogen sulfide, in processes wherein such a sulfur-bearing fuel is gasified by action of such gasification media as oxygen, steam, air, and carbon dioxide to provide a gaseous product in a form suitable for use as a fuel, or in a form suitable for conversion into either hydrogen or a synthesis gas for production of ammonia, methanol, other organic chemicals, or liquid or gaseous hydrocarbon fuels.

Another object of the invention is to provide an improved economic method for converting a sulfur-bearing oil into substantially sulfur-free gaseous or liquid products, while recovering sulfur in form of elemental sulfur or hydrogen sulfide, in processes wherein the sulfur-bearing oil is cracked or hydrocracked or hydrogasified.

Another object of the invention is to provide processes for removing sulfur compounds from gases, for desulfurizing fuels, and for recovering sulfur in form of elemental sulfur or hydrogen sulfide which do not throw off large quantities of waste heat at low temperature levels.

Another object of the invention is to provide processes capable of converting a sulfur-bearing fuel into a substantially sulfur-free clean fluid fuel for use in an advanced power cycle having effluents which are unobjectionable from the standpoint of air pollution, the processes recovering sulfur as elemental sulfur or hydrogen sulfide. An example of such a power cycle is one which incorporates a supercharged boiler in which steam is raised for a conventional Rankine steam cycle. Another example of such an advanced power cycle is one in which the temperature of steam is raised by direct addition of the products of combustion of the clean fluid fuel with oxygen or air.

Another object of the invention is to provide processes capable of converting a sulfur-bearing fuel into a substantially sulfur-free clean fluid fuel for use in existing power-generation equipment where air-pollution regulations restrict use of sulfur-bearing fuels, the processes recovering sulfur as elemental sulfur or hydrogen sulfide.

Raw fluid fuels, derived for instance from coal and heavy residual oils by a variety of processes involving gasification, carbonization, or cracking, may be substantially desulfurized by reaction at high temperature with dolomite or calcined dolomite or with an artificially-made equivalent. Examples of the use of dolomite for this general purpose are: U.S. Patent 1,950,981 (1934); Great Britain Patent 365,111 (1930); Russian Patent 119,172 (1959); and U.S. Patent 2,755,179 (1956). Calcined dolomite is not a true chemical species and will be written here as [CaO+MgO], the expression to include synthetic as well as natural forms. Its reaction with hydrogen sulfide may be written:

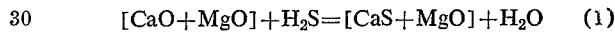

Calcined dolomite also has power to desulfurize a wide range of organic sulfur compounds, such as for example mercaptans and organic sulfides.

Use of calcined dolomite for desulfurization of fuels has previously been hampered by lack of means to recover elemental sulfur from [CaS+MgO] while also recovering [CaO+MgO] in a form suitable for reuse in a desulfurization step.

U.S. Patent 3,115,394 (1963) teaches that

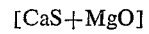

may be converted to [CaO+MgO] with elimination of sulfur in the form of sulfur dioxide, by exposing

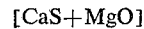

to high-temperature combustion gases containing a little hydrogen. The recovery of elemental sulfur from sulfur dioxide is not economically attractive.

According to the present invention, there is provided a process for preparing hydrogen sulfide from a solid such as sulfurized calcined dolomite, containing calcium sulfide produced by a reaction for the desulfurization of a gas, by reacting the solid with superheated steam and carbon dioxide at an elevated pressure to produce calcium carbonate and hydrogen sulfide according to the reaction:

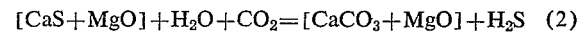

Heat thrown off by reaction 2 may be used to raise or to superheat high-pressure steam. The gaseous product of the reaction may be cooled to condense unreacted steam, and the $H_2S$ led to a Claus system for conversion to elemental sulfur. The Claus system is well known and widely used (Oil & Gas Journal, Feb. 14, 1949, page 99). Present-day Claus systems operate at substantially atmospheric pressure. In connection with the recovery of sulfur from $H_2S$ generated by reaction 2, a Claus system is preferably provided which operates at substantially the same elevated pressure as that used for reaction 2. Reaction 2 is preferably conducted in a reducing atmosphere to avoid oxidation of CaS to calcium sulfite or calcium sulfate.

The solid product of reaction 2, [$CaCO_3$+MgO], may be calcined by direct contact with combustion gases, to expel carbon dioxide, and to yield [CaO+MgO] in form suitable for reuse in a fuel-desulfurization step. Preferably, the calcination is conducted in a reducing atmosphere, to precent CaS remaining in the solid (or arising by reaction with fuel used in the calcination) from oxidation to calcium sulfate. The atmosphere may be maintained in a reducing condition by supplying oxygen to the calcination step in an amount insufficient for complete combustion of fuel supplied thereto.

As an alternative to the calcination of the solid product of reaction 2, this product may be used directly for fuel desulfurization by operating at a temperature appreciably higher than that at which reaction 2 was carried out, but not at a temperature so high that $CaCO_3$ is decomposed to CaO and $CO_2$. Under this alternative procedure, desulfurization is accomplished by the reverse of reaction 2, for which the thermodynamic equilibrium is shifted strongly to the leftward at high temperatures, thereby removing $H_2S$. If this alternative is adopted, it is generally advantageous to operate at a temperature slightly below that at which $CaCO_3$ would be decomposed.

The reaction of calcium sulfide with *liquid* water and carbon dioxide is well known; it was put to commercial use in the Claus-Chance process (Kirk-Othmer Encyclopedia, vol. 13, p. 392). Wickert (Mitteilungen der VGB, No. 83 (April 1963), p. 74) proposed that this reaction be used to regenerate $CaCO_3$ for reuse in the desulfurization of atmospheric-pressure gases generated by partial combustion of heavy residual oil with air. Wickert's proposal has disadvantages with respect to the present invention, including: (1) $CaCO_3$ is recovered in finely divided form from which is difficult to separate from desulfurized gases; (2) much heat is discharged at essentially atmospheric temperature, and cannot be put to good use.

The reaction of steam and carbon dioxide with CaS was studied at *atmospheric* pressure by Riesenfeld (Journal für praktische Chemie (2), vol. 100 (1920), p.142). Riesenfeld conducted a limited number of exploratory experiments, obtaining at 505° C. a gas containing, very roughly, about 2 volume percent $H_2S$, and lesser amounts at higher temperatures. He concluded that the conversion of CaS to $CaCO_3$ by this reaction is not a practical proposition.

A Claus sulfur-production system works at better efficiency the higher the concentration of hydrogen sulfide in feed gas to the system. A primary consideration in determining the best temperature and pressure for operation of reaction 2 in the process of this invention is that the concentration of hydrogen sulfide in dry gas from the reaction, after condensation of steam, shall be greater than the practicable minimum for the Claus system (about 7 to 10 volume percent), and preferably several times greater. According to chemical equilibrium for reaction 2, the concentration of hydrogen sulfide in dry gas is increased by working at (a) higher pressure, (b) lower temperature, and (c) higher ratio of steam to carbon dioxide in the initial gas mixture. In a particular application of the invention, a pressure of 540 pounds per square inch absolute (p.s.i.a.), a temperature of 1050° F., and an initial molar steam-to-carbon-dioxide ratio of about 1.29 produced a dry gas containing more than 50 mole percent hydrogen sulfide, far above the practicable minimum for the Claus system. Heat thrown off by reaction 2 at 1050° F. was readily employed for raising and superheating high-pressure steam.

The foregoing operating conditions are not critical, however. For example, an appreciably lower pressure can be used. Reaction 2 has been conducted experimentally at about 1000° to 1100° F. and at about 220 p.s.i.a., using an initial gas mixture which contained about 82% carbon dioxide and about 9% each of hydrogen and carbon monoxide, which was humidified with steam to afford a molar steam-to-carbon-dioxide ratio of about 0.57. Dry effluent contained about 20% to 24% hydrogen sulfide, a satisfactory level for the Claus system, and substantially in accord with chemical equilibrium for reaction 2. A higher level of hydrogen sulfide could have been obtained by working at a lower temperature, but at some sacrifice in value of the heat thrown off by reaction 2. There is usually no incentive to work at a temperature greater than about 1300° F., because the greater value of heat thrown off by reaction 2 is offset by the decline in hydrogen sulfide level in dry-gas product.

Under both of the sets of reaction conditions cited in the foregoing two paragraphs, the combination of steam partial pressure and temperature was such that calcium hydroxide would have formed if any calcium oxide had been present in the solid. If calcium hydroxide were to form, decrepitation of the solid would occur, rendering it unusable in further desulfurization operations. This danger was overcome by contacting the solid with carbon dioxide at a low partial pressure of steam, prior to conducting reaction 2, in order to convert reactive values of calcium oxide remaining in the solid to calcium carbonate. With this precaution, the subsequent chemical treatment of the solid did not cause the solid to decrepitate, nor did the treatment bring about any evident change in the solid's particle shape, as viewed in a microscope. This precaution is generally advantageous, since it allows one to carry out reaction 2 at a higher steam partial pressure than is otherwise permissible.

An advantage of the alternative procedure in which [$CaCO_3$+MgO] is used directly for fuel desulfurization, and in which the solid does not pass through the [CaO+MgO] state, is that there is never danger of formation of calcium hydroxide, and the precaution of contacting the solid with carbon dioxide at low steam partial pressure, prior to conducting reaction 2, need not be taken.

If reaction 2 is followed by a calcination step, desulfurization may be conducted over a wide range of temperature, as desired, between about 900° and 2000° F. Desulfurization and calcination may be accomplished simultaneously in one step, if desulfurization is conducted at a sufficiently high temperature, e.g., between about 1700° and 2000° F. To accomplish desulfurization and calcination simultaneously, the temperature must exceed the equilibrium decomposition temperature of calcium carbonate at the partial pressure of carbon dioxide prevailing in the desulfurization-calcination step. However, the temperature should not greatly exceed this equilibrium decomposition temperature, since the efficiency of the desulfurization declines with increasing temperature. In general, a temperature within 50° F. of the equilibrium decomposition temperature is preferred.

Under the alternative procedure, in which [$CaCO_3$+MgO] is used directly for fuel desulfurization, desulfurization should generally be conducted at a temperature between about 1600° F. and 1950° F. Under the alternative procedure, the efficiency of desulfurization declines with declining temperature, and in general, a temperature within 50° F. of the equilibrium decomposition temperature is preferred.

Fluidized beds are advantageously used in all of the process steps which have been mentioned: desulfurization, converting reactive values of calcium oxide to calcium carbonate, conducting reaction 2, and calcination. There is advantage in conducting all of the steps at substantially the same pressure, in order to facilitate the transfer of solids between steps. This being the case, the pressure will generally be determined by the pressure at which the gas to be desulfurized is available, or at the pressure at which this gas is desired, unless these pressures are too low for a satisfactory result to be obtained from reaction 2 according to chemical equilibrium for the reaction. In general, a pressure higher than about 4 atmospheres, will usually be satisfactory.

Moving beds of granular solid may also be used.

Since solids used in the process of this invention are advantageously derived from dolomite, I am outlining the chemistry of this material as follows:

Dolomite is a common rock of wide distribution. Its structure resembles that of calcite, i.e., alternating layers of carbonate ions and cations. Ideally, cation planes populated entirely by $Mg^{++}$ alternate with planes populated entirely by $Ca^{++}$. Natural dolomite seldom attains the ideal of one atom of Mg for each atom of Ca, the latter usually being present in excess.

When dolomite is calcined, intermingled crystallites of magnesium oxide and calcium oxide are formed which have no "memory" of the ordered arrangement of these elements in the dolomite structure. The crystallites are microscopic in size, and are highly reactive chemically. Magnesium oxide and calcium oxide have contrasting and complementary chemical properties. The CaO crystallites are reactive toward $CO_2$ at temperatures above about 600° F.—i.e., they absorb $CO_2$ with formation of crystallites of $CaCO_3$—and are reactive toward $H_2S$ at temperatures above about 750° F., forming crystallites of CaS. The MgO crystallites are not reactive toward either $CO_2$ or $H_2S$, but form a rugged, porous structure which can be readily penetrated by gases; thus substantially all of the CaO throughout the solid can be reacted. The CaO can be converted to $CaCO_3$ or CaS, and then returned to the CaO state, and the cycle can be repeated many times, all with no chemically-induced decrepitation of the solid. Calcium oxide by itself not only tends to decrepitate when it reacts with carbon dioxide, but also the reaction tends to stop at low conversions.

Although unreactive toward $CO_2$, the MgO crystallites in calcined dolomite have a chemical property which is sometimes useful: they are catalytic for the water-gas shift reaction at temperatures above about 750° F. Accordingly, calcined dolomite has the power to convert CO to $H_2$ according to the reaction:

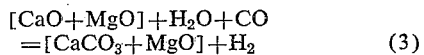

$$[CaO+MgO]+H_2O+CO = [CaCO_3+MgO]+H_2 \quad (3)$$

If a gas containing steam and carbon monoxide is desulfurized under conditions such that equilibrium for reaction 3 is strongly shifted toward hydrogen product, and if carbon monoxide is present in excess of steam, desulfurization of the gas can be virtually complete.

Artificially-made dolomites are known, differing little from natural dolomites, and calcined products prepared from such materials are satisfactory. An artificial product produced by calcining co-precipitated $CaCO_3$ and $MgCO_3$, preferably in which Mg exceeds Ca on an atomic basis, is satisfactory. The terms [CaO+MgO], [CaS+MgO], and [$CaCO_3$+MgO] are intended to include solids prepared from artificial as well as natural materials, and are not limited to solids containing Ca and Mg in exactly 1-to-1 atomic ratio.

If a natural dolomite is selected for use in the process of this invention, it should be free of calcite strata. Preferably, the Ca-to-Mg atomic ratio should not be much greater than unity, since stones having a ratio appreciably greater than unity are found to possess less resistance to deactivation by exposure to high temperatures. Stones having Ca in considerable excess will be found to sinter at high temperatures, with loss of reactivity of CaO crystallites toward $CO_2$ or $H_2S$, and with reduction of MgO's catalytic activity toward CO-shift. Stone from the Greenfield formation of Western Ohio, which has the unusually low Ca-to-Mg atomic ratio of 0.987, is reported to resist deactivation during calcination, and may be calcined repeatedly at 2000° F. without significant loss of reactivity. A stone such as that from the Greenfield formation is preferred.

Calcined dolomite has been proposed for use in a variety of cyclic high-temperature fuel-treating processes, including the promotion of hydrocarbon cracking and fuel gasification with steam while absorbing carbon dioxide, and including the manufacture of hydrogen by reaction 3. A disadvantage of these processes has previously been the gradual loss of usefulness of the solid because of absorption of sulfur and its conversion to calcium sulfate during the calcination step necessary to convert [$CaCO_3$+MgO] to [CaO+MgO] for reuse. If calcination is conducted in a reducing atmosphere (calcination effluent is a fuel gas rather than a flue gas), reaction 2 may be interposed in the cycle at a convenient point, thereby allowing recovery of sulfur and maintaining the usefulness of the solid.

If a sulfurous oil is hydrocracked over calcined dolomite, addition of steam and carbon monoxide is advantageous in order to raise the partial pressure of hydrogen, as well as to provide heat, by operation of reaction 3.

Brief description of the drawings

The invention including various novel features will be more fully understood by reference to the accompanying drawings and the following description of the several alternatives illustrated therein.

FIG. 1 diagrammatically illustrates apparatus suitable for carrying out reaction 2.

FIG. 2 diagrammatically illustrates the incorporation of the apparatus of FIG. 1 in a sequence which includes gasification of a sulfur-bearing fuel (with simultaneous desulfurization of the fuel gas produced) and the production of elemental sulfur.

FIG. 3 diagrammatically illustrates an embodiment in which a gas containing carbon monoxide is desulfurized and at the same time carbon monoxide is converted to hydrogen.

FIGS. 4 and 5 diagrammatically illustrate embodiments in which a sulfur-bearing oil is gasified or cracked simultaneously with desulfurization of gaseous products therefrom.

FIGS. 6 and 7 diagrammatically illustrate embodiments, utilizing fluidized beds and moving beds respectively, in which the product of a fuel-gasification step is desulfurized at high temperature.

Description of preferred embodiments

FIG. 1 diagrammatically illustrates apparatus suitable for conversion of [CaS+MgO] to [$CaCO_3$+MgO] while hydrogen sulfide is released. Pulverulent solid, comprising in the most general case an intimate intermingling of microscopic crystallites of CaS, CaO, $CaCO_3$, and MgO, flows downward in aerated standpipe A, across solid-flow-regulating valve 1, and into reactor 2, which houses fluidized-bed 3. Fluidizing-gas 5 is rich in carbon dioxide and preferably contains relatively small amounts of hydrogen or carbon monoxide in order to prevent the oxidation of CaS. Fluidized-bed 3 operates at an elevated temperature and pressure; the combination 1050° F. and 550 p.s.i.a., for example, is suitable. The temperature is not critical, the object of the bed being to convert reactive values of CaO in the solid to $CaCO_3$. An appreciably higher temperature may be used, provided the temperature is not so high that the recarbonation of CaO to $CaCO_3$ will not proceed at the prevailing partial pressure of $CO_2$. Heat evolved by the recarbonation reaction (as well as any heat derived from cooling of solid entering the bed) may be removed across optional heat-transfer surface 4. The heat may be used to raise or to superheat high-pressure steam. If the initial temperature of the solid is not too high, and if the solid does not contain too much CaO, bed 3 may operate adiabatically; the criterion is whether or not the adiabatic temperature level in the bed is below the level at which recarbonation will proceed.

Solid flows from reactor 2 through pipe 7 across solid-flow-regulating valve 8 into fluidized bed 10 housed in reactor 9. Fluidizing-gas 12 is predominantly a mixture of steam and carbon dioxide, preferably containing carbon monoxide or hydrogen in an amount sufficient to prevent oxidation of CaS. Reactor 9 may operate at 1050° F. and at about the same pressure as reactor 2. Reaction 2 occurs in bed 10, and gaseous effluent 13 contains a high proportion of hydrogen sulfide. Gas 13 may be cooled, with condensation of steam, and committed to a Claus system for recovery of elemental sulfur. Heat developed in bed 10 is removed across heat-transfer surface 11. Solid is withdrawn via aerated standpipe B, the flow of solid being regulated by valve 14. This solid comprises an intimate intermingling of microscopic crystallites of $CaCO_3$, CaS, and MgO. The solid may be sent to a calcination step, expelling carbon dioxide, so that the solid may be reused for desulfurization and formation of additional amounts of CaS.

Solid in standpipe A may have originated in a desulfurization step, or in a calcination step, or in another step in a cyclic process involving such steps.

Purpose of reactor 2 is to contact solid with a high partial pressure of carbon dioxide in a gas stream in which the steam partial pressure is relatively small. This contact step serves to convert reactive values of CaO in the solid to $CaCO_3$. There is advantage in operating reactor 9 with a combination of temperature and steam partial pressure such that calcium hydroxide would form in reactor 9 if reactor 2 were omitted. Formation of calcium hydroxide would result in decrepitation of the solid.

A serviceable alternative is to use a gas rich in carbon monoxide and steam as fluidizing-gas 5 to reactor 2, forming $[CaCO_3+MgO]$ by reaction 3 in this reactor. The object would be to supply carbon monoxide and steam to bed 3 in amounts such that carbon dioxide, arising from the water-gas-shift reaction, appears in effluent from this bed.

I now give an example of the process conducted in the apparatus of FIG. 1.

Example

Beds 3 and 10 were operated at 1050° F. and at outlet pressures of 550 and 540 p.s.i.a. respectively. Solid in standpipe A consisted primarily of $[CaO+MgO]$ and $[CaS+MgO]$, having originated in a calcination step. Flow quantities were:

Solid in standpipe A ____ 48,254 pounds per hour.
Fluidizing-gas 5 _____ 16,409 pounds per hour.
Fluidizing-gas 12 _____ Offgas from bed 3 (line 6), plus 6,914 pounds per hour of steam.
Effluent gas 13 _____ 15,229 pounds per hour.

Gas analyses (in mole percent) were:

|  | Fluidizing gas 5 | Effluent 13 | Effluent 13 after cooling to 150° F. |
|---|---|---|---|
| $CH_4$ | 0.02 | 0.02 | 0.03 |
| $H_2$ | 5.18 | 6.59 | 11.56 |
| CO | 4.61 | 0.86 | 1.50 |
| $H_2O$ | 11.99 | 43.35 | 0.70 |
| $CO_2$ | 78.20 | 18.25 | 31.99 |
| $H_2S$ |  | 30.71 | 53.83 |
| COS |  | 0.22 | 0.39 |

FIG. 2 illustrates an arrangement of apparatus whereby the process illustrated by FIG. 1 may act in cooperation with fuel gasification and desulfurization. This arrangement is advantageous for preparation of either a rich or a lean fuel gas at high pressure for use in power-generating equipment.

A sulfurous fuel 31 (e.g., heavy residual oil) is introduced via nozzles 33 into fluidized-bed 35 housed in reactor 34, which operates at substantially the same elevated pressure as reactor 2 or 9. If a rich fuel gas is desired, fluidizing-gas 32 may be a mixture of steam and oxygen. If a lean fuel gas is desired, fluidizing-gas 32 may be a mixture of air and carbon dioxide (or air and flue gas containing carbon dioxide). Fuel undergoes partial combustion in bed 35, and gaseous effluent from the bed is either a rich or a lean fuel gas. Solid enters bed 35 from standpipe B and consists primarily of crystallites of CaS, $CaCO_3$, and MgO. Gaseous effluent from bed 35 is substantially sulfur-free, and carries solid in dilute-phase transport upward through line 36 into cyclone-separator 37, which delivers solid into aerated standpipe A. Fuel gas is delivered from the system at 38.

One may elect to operate bed 35 at a combination of temperature and pressure such that $CaCO_3$ is decomposed to CaO and $CO_2$. In this case, solid delivered to aerated standpipe A consists primarily of crystallites of CaO, CaS, and MgO. Alternatively, one may elect to operate bed 35 at a lower temperature, at which $CaCO_3$ is not decomposed, so that desulfurization is accomplished by the reverse of reaction 2. Under this alternative, solid delivered to aerated standpipe A consists primarily of crystallites of CaS, $CaCO_3$, and MgO and contains no CaO. Reactor 2 may be omitted, and items 3 through 8 are not needed. Standpipe A would then discharge the solid across valve 1 into reactor 9.

The advantage of the first election described in the preceding paragraph is that less steam is required to maintain a steam partial pressure higher than that called for by thermodynamic equilibrium for the reaction between steam and carbon. Also, solid containing CaO may be made available from reactor 34 for desulfurization operations conducted at lower temperatures, such as the examples which will be described hereinafter in connection with FIGS. 3, 4, and 5. An advantage of the second election is that equipment is simpler.

The temperature in reactor 35 should be selected with reference to the two foregoing elections and to the partial pressure of carbon dioxide prevailing in the reactor. Under the first election, the temperature should be higher than the temperature at which the equilibrium decomposition pressure of $CaCO_3$ corresponds to the prevailing $CO_2$ partial pressure. Under the second election, the operating temperature should be at least slightly below the equilibrium decomposition temperature for $CaCO_3$. In general, for operating pressures between about 4 and 100 atmospheres, the temperature level in reactor 35 should be between about 1600° and 2000° F.

If rich fuel gas is produced for use in the aforementioned improved power cycle, in which the temperature of steam is raised by direct addition of products of combustion of the fuel with oxygen, an advantageous source of carbon dioxide required in gas 5 is the substantially pure carbon dioxide recovered when steam is condensed from cycle fluid in a condenser. If substantially pure carbon dioxide is not available, from this or another source, a carbon-dioxide-rich flue gas is satisfactory. Reducing values in gas 5 may be supplied by diverting a small amount of product gas 38 to this use. Fluidizing-gas 12 to bed 10 may advantageously be made up, as shown in FIG. 2, of effluent 6 from bed 3 together with steam supplied at 15.

Effluent 13 from bed 10 is cooled by heat-exchanger 16, or by a series of heat-exchangers (not shown), and water condensate is separated from the gas in drum 17 and is discarded via line 18. Gas rich in hydrogen sulfide from drum 17 is carried via line 19 to a pressurized Claus system 20, which is supplied with compressed air or oxygen via line 21. The pressure level in the Claus system is preferably substantially the same as in reactor 9. In the Claus system, hydrogen sulfide is converted via known chemical reactions to elemental sulfur, which is withdrawn via line 22, preferably in molten form. Effluent gas from the Claus system, still at elevated pressure, is withdrawn to power-recovery equipment (not shown) via line 23.

FIG. 3 illustrates how the equipment of FIG. 2 may act in cooperation with the desulfurization of a gas at conditions of temperature and pressure such that $CaCO_3$ is formed, under the election for operation of reactor 34 in which $CaCO_3$ is decomposed in this reactor, so that CaO is present in solid from cyclone-separator 37. A portion of solid from cyclone-separator 37 is diverted via standpipe C across solid-flow-regulating valve 41 into reactor 43, which houses fluidized-bed 44 and operates at substantially the same high pressure as the equipment of FIG. 2. Fluidizing-gas 42 to bed 44 might be, for example, a mixture of steam, carbon monoxide, and hydrogen, containing hydrogen sulfide. Conditions of temperature and pressure in bed 44 may be selected so that reaction 3 occurs to almost any desired degree, converting carbon monoxide into hydrogen. For example, at 1200° F. and 550 p.s.i.a. the carbon-monoxide-content of effluent 46 from bed 44 may be reduced to less than 0.1 mole percent. Conditions giving rise to formation of calcium hydroxide should be avoided, however, to prevent solid decrepitation. Simultaneously with the progress of reaction 3, the hydrogen product is substantially desulfiurized by operation of reaction 1. Heat is withdrawn across heat-transfer surface 45. Solid is withdrawn from reactor 43 via standpipe D across solid-flow-regulating valve 47, and is sent to reactor 34, where the solid is calcined. In some cases an advantage is gained by employing air depleted in oxygen as part or all of fluidizing-gas 32. Such air depleted in oxygen may some times be available from a process which abstracts oxygen from air, e.g., by low-temperature rectification of air, or by absorption of oxygen from air by a solid such as BaO at high temperature.

If the quantity of carbon monoxide converted to hydrogen in reactor 43 is large relative to the amount of sulfur removed from gases passing through this reactor, it may be advantageous to send no solid directly from cyclone-separator 37 to sulfur recovery (equipment items 1–23), but to cause all of the solid to pass through reactor 43. In this case, solid may be diverted from standpipe D to sulfur recovery, and returned therefrom to reactor 34.

FIG. 4 illustrates how the equipment of FIG. 2 may act in cooperation with a variety of fuel-cracking operations. For simplicity, the equipment of FIG. 2 is not shown in FIG. 4; reactor 55 in FIG. 4 may be regarded as an alternate to reactor 43 in FIG. 3.

The operation of FIG. 4 will first be described under the election for operation of reactor 34 in which $CaCO_3$ is decomposed in this reactor. Under this election, solid comprising primarily CaO, CaS, and MgO enters reactor 55 via standpipe C across solid-flow-regulating valve 41. Reactor 55 operates at substantially the same high pressure as the equipment of FIG. 2, and houses fluidized-bed 54, to which a sulfur-bearing oil is fed from line 51 via nozzles 53.

A wide variety of oil-gasification and oil-cracking and oil-hydrocracking and oil-hydrogasification operations may be conducted in reactor 55, depending upon the choice of fluidizing-gas 52 and the choice of operating temperature. It will be sufficient to indicate some of the possibilities.

Fluidizing gas 52 to bed 54 may be, for example, oxygen and steam, and the operating temperature may be set between about 1400° and 1700° F. Effluent 56 from bed 54 will then comprise a rich fuel gas with a high content of hydrogen and carbon monoxide. By operating bed 54 under conditions such that $CaCO_3$ is formed, the consumption of oxygen in production of this rich fuel gas will be less than the consumption of oxygen in production of a rich fuel gas according to the embodiment of FIG. 2 acting alone, in which fluidizing-gas 32 is oxygen and steam. In the embodiment of FIG. 4, if reactor 55 operates at a lower temperature than the cooperating reactor 34, part of the heat required to gasify the oil can be supplied by hot solid entering via standpipe C; additional heat can be supplied by the heat of recarbonation of CaO.

A fuel gas or vapor rich in hydrocarbons can be obtained by operating at a lower temperature level, between about 1100° and 1500° F., and by operating in a manner such that cracking reactions play a greater role. Fluidizing-gas 52 may be air, yet a substantially sulfur-free fuel gas or vapor of high heating value may be obtained in this manner, well suited for use as a fuel to a gas turbine, or to an existing steam boiler where air-pollution-control regulations restrict the use of sulfur-bearing fuels, or to a supercharged boiler, or to an advanced power cycle in which the temperature of steam is raised by direct addition of products of combustion of the fuel gas or vapor with air.

Reactor 55 may be operated as a hydrocracker by employing as fluidizing-gas 52 a gas rich in hydrogen. The operating temperature should be between about 950° and 1200° F. Fluidizing-gas 52 advantageously contains carbon monoxide as well as hydrogen, together with steam, so that additional hydrogen is formed by reaction 3 within bed 54. Control of the temperature of bed 54 may be accomplished by adjusting the amount of steam so that the heat resulting from reaction 3 is varied.

Oil may be hydrogasified in reactor 55, to yield a gas containing substantial amounts of methane, by using substantially pure hydrogen as fluidizing-gas 52 and by operating at a temperature between about 1300° and 1500° F.

Gasification or cracking conditions in reactor 55 may be controlled so that solid withdrawn via standpipe D carries with it a large amount of carbon, providing a substantial portion or even all of the fuel required for the partial combustion which occurs within reactor 34.

Reactor 55 may also be operated to gasify oil under the election for operation of reactor 34 in which $CaCO_3$ is not decomposed. Under this election, desulfurization would be accomplished in both reactor 34 and reactor 55 by the reverse of reaction 2. A rich fuel gas might be produced, for example, by gasifying oil with use of oxygen and steam (or air and steam) as fluidizing-gas 52 to reactor 55, which should operate at a temperature just below that at which $CaCO_3$ would decompose. Reactor 55 could advantageously operate at a steam partial pressure below that corresponding to equilibrium for the steam-carbon reaction. Carbon laid down upon or within the solid in reactor 55 may serve as at least a portion of the fuel consumed in reactor 34, where a lean fuel gas may advantageously be produced. If, in a given situation, a need for a substantial amount of a lean fuel gas is not at hand, reactor 34 may serve simply to burn off carbon laid down upon or within the solid in reactor 55, and no fuel would be added to reactor 34 via line 31 and nozzles 33.

Some oils contain mineral matter which will be deposited upon and within the solid passing through reactor 55. Where this is the case, systematic withdrawals of small amounts of solid, accompanied by corresponding additions of fresh solid, will serve to keep the level of mineral matter on the solid within bounds. In some instances, recovery of valuable mineral from the withdrawn solid with be possible.

FIG. 5 illustrates another embodiment in which the equipment of FIG. 2, under the election for operation of reactor 34 in which $CaCO_3$ is decomposed, may act in cooperation with a fuel-desulfurization-and-gasification step in which $CaCO_3$ is formed. For simplicity, the equipment of FIG. 2 is not shown in FIG. 5; reactor 62 of FIG. 5 may be regarded as an alternate to reactor 43 in FIG. 3.

Reactor 62 houses an upper fluidized-bed 64 and a lower fluidized-bed 63, the fluidizing-gas to bed 64 comprising the off gas from bed 63. Solid comprising CaO, CaS, and MgO enters upper bed 64 via standpipe C across solid-flow-regulating valve 41. Reactor 62 operates at substantially the same high pressure as the equipment of FIG. 2. A sulfur-bearing oil is fed from line 65 via nozzles 66 into bed 64, which may operate between about 950° and 1500° F. Cracking and hydrocracking reactions split the oil into a gas or vapor fraction and into coke, which is laid down upon and within the solid. Solid together with coke passes from bed 64 via line 67 across solidflow-regulating valve 68 into bed 63. Fluidizing-gas 61 to bed 63 is oxygen and steam, or air and steam. Coke is gasified in bed 63, and offgas from bed 63 is rich in hydrogen. Solid effluent leaves bed 63 via standpipe D, and may still contain coke, which would then serve as at least a portion of the fuel required for the partial combustion which occurs in reactor 34. Bed 63 may operate at a temperature such that recarbonation of CaO occurs— e.g., between about 1500° and 1700° F.—thereby supplying heat to the gasification reactions which occur in bed 63. Alternatively, bed 63 may operate at a higher temperature, so that $CaCO_3$ is decomposed in bed 63. The arrangement of FIG. 5 is capable of producing substantially desulfurized fuel gases or vapors having a wide range of heating values and compositions, as conditions in beds 63 and 64 are varied.

FIG. 6 is an embodiment in which a fuel gas may be desulfurized at high temperature. Fuel gas is introduced via line 76 into reactor 77 which houses fluidized-bed 78. Solid comprising primarily $CaCO_3$, CaS, and MgO enters bed 78 via standpipe B from sulfur recovery equipment items 1–23, which are shown in FIG. 2. One may elect to operate bed 78 at a temperature sufficient to decompose $CaCO_3$, so that CaO is formed to react with sulfur compounds in the fuel gas. Alternatively, one may elect to operate bed 78 at a temperature just a little below that which is sufficient to decompose $CaCO_3$, so that desulfurization is accomplished by the reverse of reaction 2. Solid is carried from bed 78 in dilute-phase transport via line 80 into cyclone-separator 81, which delivers solid to standpipe A and thence to sulfur recovery equipment items 1–23. Product fuel gases leave at 82. If necessary, the temperature of bed 78 is controlled by withdrawing heat across optional heat-transfer surface 79.

By way of example, a method of production of the sulfur-bearing fuel gas in line 76 is illustrated schematically in FIG. 6. Sulfur-bearing fuel, such as residual fuel oil or coal, is charged together with steam via line 71 to partial-combustion chamber 73, designated by a rectangle containing the letters PC. Oxygen is fed to chamber 73 via line 72. Effluent from chamber 73 comprises largely hydrogen and carbon monoxide, together with a lesser amount of carbon dioxide, some unreacted steam, and usually some unreacted carbonaceous matter. Partial-combustion equipment like chamber 73 is commercially available for operation at pressures as high as 100 atmospheres. By operating reactor 77 at 1900° to 2000° F., typical gas mixtures which result from partial combustion in such equipment may be substantially desulfurized at pressures well over 100 atmospheres. Typically, the amount of unreacted steam in effluent from chamber 73 passing through line 74 is not sufficient to satisfy the steam-carbon equilibrium at 1900° to 2000° F. and at 100 atmospheres. It is preferable that steam be added via line 75, if necessary, so that gases in line 76 contain steam in excess of the steam-carbon equilibrium under the conditions selected for operation of reactor 77. This addition of steam is desirable both to avoid carbon-formation within bed 78 and also to promote further gasification of unreacted carbonaceous matter within bed 78, although the additional steam reduces the efficiency of fuel-gas-desulfurization in bed 78. In general, gases from chamber 73 are at such a high temperature that heat-transfer surface 79 will be required. The product fuel gases at 82 may be cooled, subjected to catalytic carbon-monoxide-shift, and scrubbed to remove carbon dioxide, yielding a hydrogen-rich product gas. Carbon dioxide for use at 5 in the sulfur recovery equipment shown in FIG. 2 may be supplied from carbon dioxide recovered from scrubbing liquid used in this processing sequence.

FIG. 7 illustrates an embodiment having the same general purpose as FIG. 6, in which the various process steps are conducted in moving beds rather than fluidized beds. Effluent 74 from chamber 73 is cooled in heat-exchanger 91, and steam is added via line 92. The combined gases are led via line 93 to the space formed about downpipe 95, which allows a mass of granular solid to flow by gravity downward into reaction space 94. The granular solid comprises primarily $CaCO_3$, CaS, and MgO. Gases enter the moving mass of solid across a surface lying approximately at the angle of repose of the granular solid, and gases and solid flow co-currently downward through space 94, the gases undergoing desulfurization by reaction with the solid.

One may elect to regulate the temperature of gases in line 93 so that $CaCO_3$ in the solid is decomposed in space 94; the operation of FIG. 7 will first be described under this election. Alternatively, one may elect to regulate the temperature of gases in line 93 so that the temperature in space 94 is just a little below that at which $CaCO_3$ would decompose; under this alternate election, the equipment of FIG. 7 may be simplified, as will be discussed below.

Gases disengage from the solid into the space formed about the skirt 96, which constitutes an extension of space 94 downward into conical chamber 99. Substantially desulfurized gases are withdrawn via line 98. Solids move downward by gravity flow through conical chamber 99 and through downpipe 100, which extends downward into conical chamber 101. A gas rich in carbon dioxide, containing little or no steam, and preferably containing some hydrogen or carbon monoxide, is introduced via line 102 into the space formed about downpipe 100. The solid is forced through transport line 103 by a decline in pressure in the gas introduced via line 102. Line 103 conducts the solid first downward, then through a U-bend, then vertically upward to a suitably high elevation, and then through an inverted U-bend into conical chamber 108 via downpipe 107. As the solid is transported through line 103, it is cooled by a cooling medium (water, for example) which is supplied to cooling jacket 105 via line 104 and is withdrawn via line 106. The quantity of gas introduced via line 102 and the temperature reached in chamber 108 should be adjusted so that substantially all reactive values of CaO in the solid have been converted to $CaCO_3$ at this point. Gases are withdrawn via line 109 from the space formed about downpipe 107 within conical chamber 108. Solid passes by gravity downward via line 110 and downpipe 111 into conical chamber 112. A gas comprising steam and carbon dioxide, and preferably containing some hydrogen and carbon monoxide, is introduced via line 113 into the space formed about downpipe 111 within chamber 112, and the gas and solid flow cocurrently downward through line 114, the gas and solid reacting according to reaction 2. Line 114 is cooled by a cooling medium (water, for example) which is supplied to cooling jacket 116 via line 115 and is withdrawn via line 117. Gas comprising a high proportion of hydrogen sulfide is withdrawn via line 120 from the space formed about downpipe 118 in conical chamber 119. Solid passes downward through line 121 and downpipe 122 against a counterflow of steam, which is introduced via line 124 into the space formed by downpipe 122 in conical chamber 123. Solid passes alternately via line 125 or 126 and valve 127 or 128 respectively into lock-hopper 129 or 130, respectively. For example, valve 128 may be open and solid may be passing into lock hopper 130; valve 132 is closed. Meanwhile, valve 127 is closed, and lock-hopper 129 communicates via the open valve 131 and line 133 with surge chamber 135. When lock-hopper 130 is full of solid, valves 128 and 131 are closed. Valve 132 is opened, so that hopper 130 may dump solid via line 134 into chamber 135. At the same time, valve 127 is opened, and solid is allowed to flow into hopper 129. The rate of flow of solid through the continuous path beginning with chamber 135 and downpipe 95 and ending with chamber 123 is controlled by the position of valve 127 or 128.

The embodiment of FIG. 7 may be simplified, if desired, by omitting conical chamber 108 and gas-takeoff-line 109. In this case, carbon dioxide introduced via line 102 is used together with steam admitted via line 113 in the reaction which takes place in line 114.

An alternate simplification of FIG. 7 is to omit conical chamber 101 and gas-entry-line 102. In this case, a portion of fuel gas is diverted from gas-takeoff-line 98, and caused to flow downward through conical chamber 99, through transport line 103, and out through gas-takeoff-line 109. This portion of fuel gas should be sufficient in amount so that reactive values of CaO in the solid are fully recarbonated by reaction 3 by the time the solid reaches conical chamber 108.

The equipment of FIG. 7 may be simplified under the alternate election, mentioned previously, in which the temperature of gases in line 93 is regulated so that the temperature in space 94 is just a little below that at which $CaCO_3$ would decompose. Under this alternate, desulfurization in space 94 is accomplished by the reverse of reaction 2. Steam and carbon dioxide may be introduced via line 102, and reaction 2 may be conducted in the forward direction in line 103. Preferably, a little fuel gas is diverted from gas take-off-line 98 and caused to flow through line 103 together with the steam and carbon dioxide. Hydrogen sulfide may be removed via line 109, and equipment items 110 through 120 may be omitted. Conical chamber 108 would discharge solid to line 121.

I do not wish my invention to be limited to the particular embodiments of the accompanying figures, which do no more than illustrate its possibilities. Those skilled in the art will recognize other arrangements which will differ from my examples only in detail, not in spirit. Only such limitations should be imposed as are indicated in the appended claims.

I claim:

1. A process useful in the preparation of sulfur, the desulfurization of a fuel, or the preparation of hydrogen sulfide, comprising: reacting calcium sulfide with steam and carbon dioxide at a pressure greater than about 4 atmospheres and at a temperature below about 1300° F. to produce calcium carbonate and hydrogen sulfide.

2. The process of claim 1 including the additional step of reacting a sulfur-bearing fuel with said calcium carbonate to produce said calcium sulfide.

3. The process of claim 1 including additional steps comprising: calcining said calcium carbonate to yield calcium oxide and reacting a sulfur-bearing fuel with said calcium oxide to produce said calcium sulfide.

4. A process useful in the preparation of sulfur, the desulfurization of a fuel, or the preparation of hydrogen sulfide, comprising: reacting a sulfur-bearing fuel with a solid containing intermingled microscopic crystallites of calcium carbonate or calcium oxide and magnesium oxide to convert at least a portion of said crystallites of calcium carbonate or calcium oxide to crystallites of calcium sulfide, and reacting the solid containing calcium sulfide with super-heated steam and carbon dioxide at elevated pressure to yield hydrogen sulfide and a solid containing calcium carbonate.

5. The process of claim 4 in which said solid containing intermingled microscopic crystallites of calcium carbonate or calcium oxide and magnesium oxide is produced by steps which include the calcining of a natural dolomite.

6. The process of claim 4 including the additional step of producing elemental sulfur from said hydrogen sulfide in a system of the Claus type operating at substantially the same elevated pressure as that used in the reacting of said solid containing calcium sulfide with superheated steam and carbon dioxide.

7. The process of claim 4 including the additional step of heating said solid containing calcium carbonate to yield a solid containing microscopic crystallites of calcium oxide capable of absorbing sulfur from a fuel.

8. The process of claim 7 in which said heating is carried out in presence of hydrogen and carbon monoxide to provide a reducing atmosphere.

9. The process of claim 7 in which said heating and said reacting of said solid containing calcium sulfide with superheated steam and carbon dioxide are conducted in fluidized beds.

10. The process of claim 4 including the adjusting of the temperature and steam partial pressure for said reacting of said solid containing calcium sulfide with superheated steam and carbon dioxide so that said steam partial pressure exceeds the equilibrium decomposition pressure of calcium hydroxide at said temperature.

11. The process of claim 10 including the additional step: before said reacting of said solid containing calcium sulfide with superheated steam and carbon dioxide, reacting said solid with carbon dioxide in order to convert any calcium oxide remaining from said reacting of said sulfur-bearing fuel to calcium carbonate.

12. A process useful in the preparation of sulfur, the desulfurization of a sulfur-bearing fuel undergoing gasification, or the preparation of hydrogen sulfide, comprising: charging said fuel to a fluidized bed to which is fed a solid containing intermingled microscopic crystallites of calcium carbonate and magnesium oxide, fluidizing said bed with a gas primarily made up of constituents selected from the group comprising steam, oxygen, air, carbon dioxide, flue gas, and air depleted in oxygen, separating gaseous product from said bed, and subjecting solid withdrawn from said bed to steps which include the reacting of said solid with superheated steam and carbon dioxide at an elevated pressure to produce hydrogen sulfide.

13. A process useful in the preparation of sulfur, the desulfurization of a gas mixture containing steam and carbon monoxide undergoing conversion to hydrogen, or the preparation of hydrogen sulfide, comprising: reacting said gas mixture at elevated pressure with a solid containing intermingled microscopic crystallites of calcium oxide and magnesium oxide to convert at least a portion of said carbon monoxide to hydrogen and to yield a solid containing calcium carbonate and calcium sulfide; and subjecting said solid containing calcium carbonate and calcium sulfide to steps which include the reacting of said solid with superheated steam and carbon dioxide at substantially the same elevated pressure to yield hydrogen sulfide.

14. A process useful in the preparation of sulfur, the desulfurization of a sulfur-bearing oil undergoing gasification, cracking, hydrocracking, or hydrogasification, or the preparation of hydrogen sulfide, comprising: charging said oil to a fluidized bed to which is fed a solid containing intermingled microscopic crystallites of calcium oxide and magnesium oxide; fluidizing said bed at elevated pressure and temperature with a gas primarily made up of constituents selected from the group comprising oxygen, air, steam, hydrogen, and carbon monoxide to produce an effluent from said bed comprising a fuel gas or vapor and to convert at least a portion of said crystallites of calcium oxide to crystallites of calcium sulfide; and subjecting solid withdrawn from said bed to steps which include the reacting of said solid with superheated steam and carbon dioxide at substantially the same elevated pressure to yield hydrogen sulfide.

15. A process useful in the preparation of sulfur, the desulfurization of a sulfur-bearing oil undergoing gasification or cracking, or the preparation of hydrogen sulfide, comprising: charging said oil to a fluidized bed to which is fed a solid containing intermingled microscopic crystallites of calcium carbonate and magnesium oxide and substantially no calcium oxide; fluidizing said bed at elevated pressure with a gas primarily made up of constituents selected from the group comprising oxygen, air, steam, hydrogen, carbon dioxide, and carbon monoxide to produce an effluent from said bed comprising a fuel gas and to convert at least a portion of said crystallites of calcium carbonate to crystallites of calcium sulfide; adjusting the temperature of said fluidized bed to a level slightly below the temperature at which calcium carbonate would decompose; adjusting the composition of said fluidizing gas so that said fuel gas contains steam below the amount called for by thermodynamic equilibrium for the reaction between steam and carbon at said temperature and said elevated pressure of said fluidized bed; and subjecting solid withdrawn from said bed to steps which include: burning off at least a part of carbon contained on or in said solid with an oxygen-containing combustant supplied in an amount insufficient for complete combustion of said carbon, so that combustion gases contain carbon monoxide, and regulating said burning off of said carbon so that the temperature at which calcium carbonate would decompose is not attained; reacting said solid with superheated steam and carbon dioxide at substantially said elevated pressure to yield hydrogen sulfide; and returning said solid to said fluidized bed.

16. A process useful in the preparation of sulfur, the desulfurization of a sulfur-bearing fuel gas or synthesis gas, or the preparation of hydrogen sulfide, comprising: contacting said gas with a solid containing intermingled microscopic crystallites of calcium carbonate and magnesium oxide at a pressure greater than about 4 atmospheres and at a temperature within about 50° F. of the equilibrium decomposition temperature of calcium carbonate at the prevailing partial pressure of carbon dioxide, thereby converting at least a portion of said crystallites of calcium carbonate to calcium sulfide; withdrawing gas from the resulting solid; and cooling said resulting solid and reacting said resulting solid with steam and carbon dioxide at substantially said pressure to yield hydrogen sulfide.

17. The process of claim 16 in which steam is added to said sulfur-bearing gas so that the total quantity of steam in said gas exceeds the amount required by thermodynamic equilibrium for the reaction between carbon and steam in the contacting of said gas with said solid.

18. The process of claim 16 in which said contacting of said sulfur-bearing gas and said reacting of said resulting solid with steam and carbon dioxide are conducted in fluidized beds.

19. The process of claim 16 in which said contacting of said sulfur-bearing gas and said reacting of said resulting solid with steam and carbon dioxide are conducted in moving beds.

References Cited

UNITED STATES PATENTS

| | | | |
|---|---|---|---|
| 2,348,543 | 5/1944 | Johnson | 208—226 |
| 2,364,390 | 12/1944 | Schaafsma | 208—226 |
| 2,551,905 | 5/1951 | Robinson | 23—3 X |
| 2,740,691 | 4/1956 | Burwell | 23—181 |
| 2,970,893 | 2/1961 | Viles | 23—181 |

OTHER REFERENCES

Kirk-Othmer, "Encyl. of Chem. Technol.," vol. 13, p. 392 relied on (1954).

OSCAR R. VERTIZ, *Primary Examiner.*

A. GREIF, *Assistant Examiner.*